United States Patent [19]
Madonian et al.

[11] 3,921,264
[45] Nov. 25, 1975

[54] ELECTRICALLY OPERATED ROTATIONAL ACTUATOR WITH FAILSAFE DISENGAGEMENT

[75] Inventors: Vahe S. Madonian, La Puente; Peter I. O. Keskine, Van Nuys, both of Calif.

[73] Assignee: International Telephone and Telegraph Corporation, New York, N.Y.

[22] Filed: July 8, 1974

[21] Appl. No.: 486,302

[52] U.S. Cl. ................................................. 74/785
[51] Int. Cl.² ...................... F16H 3/44; F16H 57/10
[58] Field of Search ..................................... 74/785

[56] References Cited
UNITED STATES PATENTS

| | | | |
|---|---|---|---|
| 2,959,983 | 11/1960 | Wise | 74/785 X |
| 2,992,819 | 7/1961 | Jackson | 74/785 X |
| 3,154,302 | 10/1964 | Maruyama | 74/785 X |
| 3,456,528 | 7/1969 | Maruyama | 74/785 |
| 3,690,198 | 9/1972 | Huber | 74/785 |

*Primary Examiner*—Leonard H. Gerin
*Attorney, Agent, or Firm*—William T. O'Neil

[57] ABSTRACT

A rotational actuator including an electric motor and gear reduction means. The gear reduction is at least partly provided by a planetary arrangement which transmits the rotational motion or permits its output shaft to "free-wheel" as a function of engagement or disengagement of a solenoid operated device for restraining the rotation of the ring gear of a planetary subassembly or permitting its free rotation, respectively. The output shaft is thus readily manually overridden when the solenoid is not energized. An optional overcenter resilient means (compression spring) provides for return of the output shaft to a first or second extreme position when the solenoid is deenergized.

10 Claims, 3 Drawing Figures

ELECTRICALLY OPERATED ROTATIONAL ACTUATOR WITH FAILSAFE DISENGAGEMENT

BACKGROUND OF THE INVENTION

1. Field of the Invention

The invention relates to rotational drives or actuators, particularly motor-driven actuators involving substantial gear reduction.

2. Description of the Prior Art

Actuators are, of course, of themselves old. Electric and hydraulic motors, and other sources of mechanical power have long been used in connection with, or in cooperating with, gear reduction devices for converting the high speed, low torque product of such sources to a lower speed, higher torque format for the operation of valves, airfoil surfaces in aircraft, vehicle steering mechanisms, and a host of other positioning duties.

In many applications, it is important that it be possible and not unduly difficult to manually override the output shaft of the actuator. For example, the airfoil surfaces of some aircraft, which are normally manually operated by a pilot through the manual control system of the aircraft, may become sluggish or difficult to operate, as for example, during icing conditions. In such circumstances, a power boost, which is self disengaging, once the desired setting has been obtained, is very desirable.

In the prior art, various devices are extant involving actuators with gearbox and friction clutch combinations, to serve such purposes. Clutching, when effected at high torque and low speed, results in cumbersome relatively heavy machinery. Moreover, electrically controllable clutching at higher speed, lower torque positions in a gear train also presents problems mechanically, in that the usual friction clutch is difficult to construct with a very high degree of freedom in the disengaged position and a substantially zero slip in the engaged position unless sizable components of substantial weight are used. Still further, such relatively large components require the use of considerable electric power merely to operate the electromagnetic (solenoid) controls associated therewith.

In addition to manual override, there are applications such as the control of certain valves, which require, in the event of power failure or failure of the actuator itself, that the valve be returned to an opened or closed position whichever is nearest or last occupied. This requirement can be particularly important in hydraulic systems or in fuel control arrangements. The manner in which the present invention solves the problem by means of novel structure will be evident as this description proceeds.

SUMMARY OF THE INVENTION

The present invention involves the provision of a compact, lightweight, low-power requirement, actuator engagement system. The drive motor powers the sun gear of a planetary gear subassembly, through an initial partial gear reduction, if desired. The planetary subassembly involves one or more planetary gear carriers which may be disc or spider-like parts supporting at least one planetary gear. In order to balance the arrangement in respect to lateral forces, the use of three planetary gears in each planetary subassembly is desirable. All three such gears engage the sun gear essentially along the central axis of the device, and also engage the internal threads of a circumferential ring gear.

Assuming the said ring gear is retained in position and not permitted to rotate, the sun gear drives the planetary gear around itself causing the planetary subassembly disc or spider to rotate with a further gear reduction factor, vis-a-vis, the said sun gear. In order to achieve additional gear reduction, a gear about the central axis of the device and attached to the said planetary gear carrier may itself act as a sun gear for an additional stage of gear reduction through another planetary gear subassembly operating against the same or another ring gear around the outer circumference thereof.

By controlling one of the said ring gears between the "free-to-rotate" condition and a "restrained-in-place" condition, the motor and additional gearing between the motor and sun gear may be disengaged from, or firmly engaged to, the output shaft of the actuator device, respectively. The present specification describes a novel combination of electromagnetic control device and planetary gear assembly to produce these desired results in a small relatively inexpensive and reliable device.

By energizing the electromagnetic device in parallel with the drive motor, for example, the output shaft is automatically disengaged whenever the motor is not operative, thus providing an ideal arrangement for manual override of the output shaft.

In connection with certain applications of the device of the invention, for example, in the control of a fuel, pneumatic, or hydraulic valving system, a dead-center spring or other resilient device can provide for completion of the control motion if a power or actuator failure occurs when the output shaft travel is past dead-center, or for return to an initial position if such a failure occurs before reaching dead-center.

The details of the novel manner of accomplishing the general object of the present invention, and further novel aspects of the device will be apparent as this description proceeds.

DESCRIPTION OF THE PREFERRED EMBODIMENT

Figure 1:
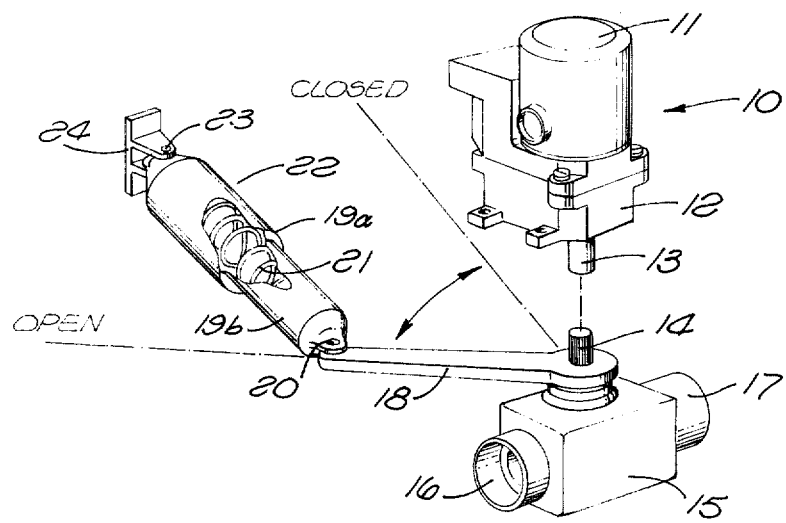
FIG. 1 is a pictorial view of a valve control system incorporating an actuator according to the invention.

Referring now to FIG. 1, the pictorial representation includes a rotational actuator 10 in accordance with the present invention. The actuator includes a motor 11, which would commonly be an electric motor, although it is to be understood that a hydraulic motor, an air turbine or some other form of motive power could be used from the range of alternatives available within the ordinary skill of the art. The motor 11 drives the reduction gear assembly 12; its output shaft 13 turning at a comparatively few revolutions per minute (even down to a fraction of a revolution per minute) according to the requirements of any specific application.

In the showing of FIG. 1, the actuator is employed to control a valve 15. This valve might be, for example, a ball or plug type having a control lever 18 with a total angular travel of 90° between fully open and fully closed positions. These open and closed conditions refer to the fluid path through the valve body from an inlet 16 to an outlet 17, for example.

The motor 11 would normally be a reversible type, having for example, alternate field connections or some other arrangement permitting the selection of either direction of rotation. The reduction gear assembly output shaft 13 might be connected by a spline or some other known means to the valve hub 14 in fixed relationship with the lever 18. In arrangements of this type it is frequently desirable to be able to manually override the actuator for various reasons, including the case of a failure within the actuator or loss of electrical power. Accordingly, the disengagement feature, which will be described hereinafter, permits manual setting of the lever 18 and therefore manual selection of the valve condition of opening or closure.

A resilient biasing means 22 is shown in the form of a compression spring 21, housed within two telescoping tubular sections 19a and 19b. This resilient device operates between a fixed mount 24 and the lever 18 and is held with rotational freedom about pins 20 and 23.

It will be evident that the resilient means 22 experiences maximum compression when the valve is somewhat between the open and closed positions. Normally this would be when the lever 18 is in the so-called "dead-center" position halfway between the open and closed positions. The compressive force exerted by 22 is not sufficient to prevent the actuator 10 from rotating the lever 18 in accordance with the direction of rotation of shaft 13, however, as this description proceeds it will be realized that, if the engagement controlling solenoid (electrode-mechanical device) within 12 is engaged and disengaged contemporaneously with the energization of the motor 11, then, when the motor is not energized, it and a portion of the gear reduction within 12, will be disengaged, permitting the shaft 13 to turn relatively freely in response to either a manual override force applied to the lever 18 or the force of the resilient means 22.

Another important function of the resilient means 22 involves the avoidance of intermediate positions of the valve 15 in the event of actuator or power failure, in a system requiring only fully open or fully closed operation of the valve 15. In some more elaborate valve applications, the valve might involve several functions, for example, the drainback of fuel in a diesel fuel system in one position and coupling in of a fuel pump for normal operation in the other position. In such systems intermediate positions of the lever 18 and therefore of the valve itself, are undesirable.

In FIG. 1, failure of the actuator 10 or the electrical power anywhere between the so-called "dead-center" position of 18 and the fully open position will permit the resilient means 22 to return the valve to the fully open position. Similarly, any failure on the side toward closure from dead-center permits the resilient means 22 to advance the lever 18 to the position corresponding to full closure of the valve 15.

In describing the application of the actuator of the present invention to a valving system, it is not intended to indicate that such an application of the present invention is anything other that a typical or representative application.

Figure 2:
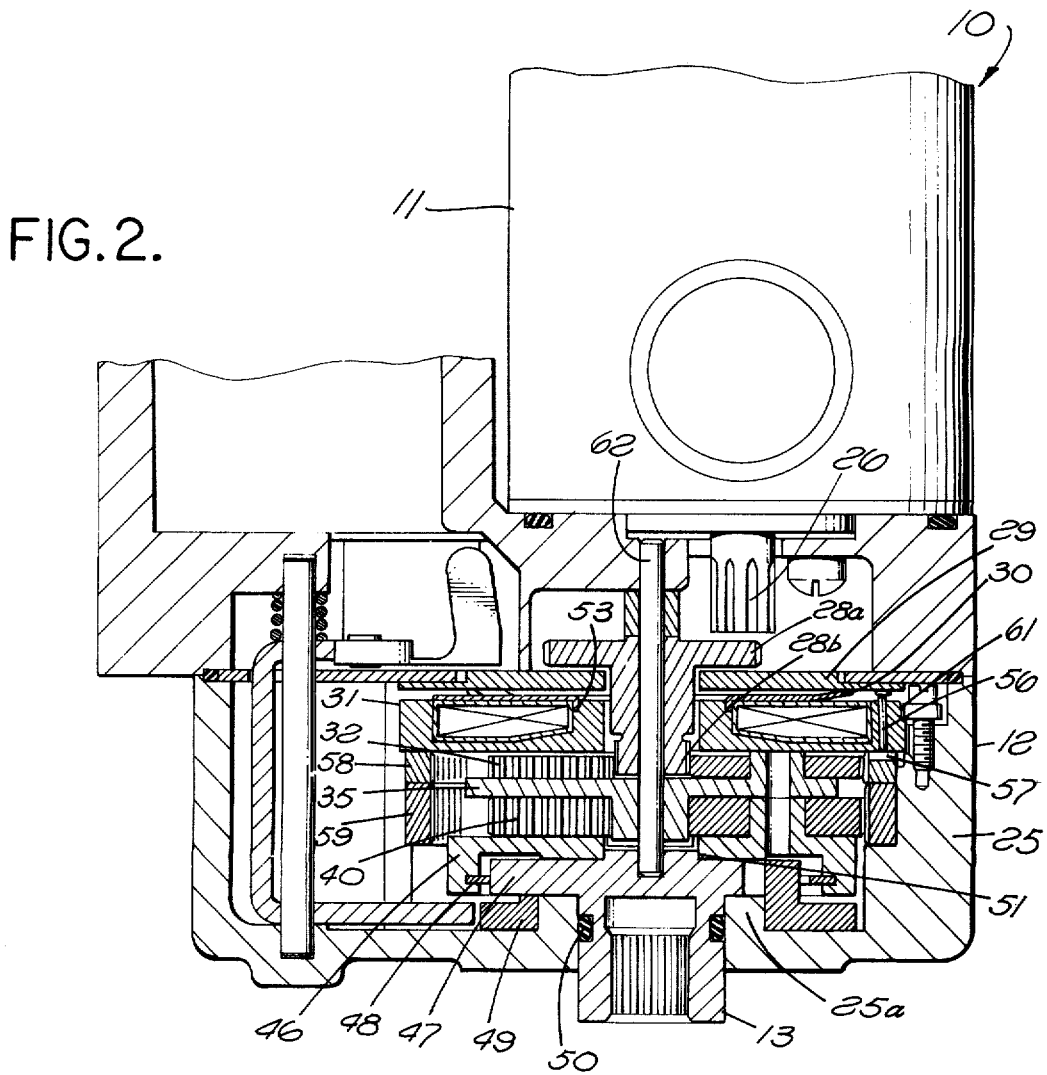
FIG. 2 is a sectional view showing internal construction of the reduction gear and engagement/disengagement structure in accordance with the invention.
Figure 3:
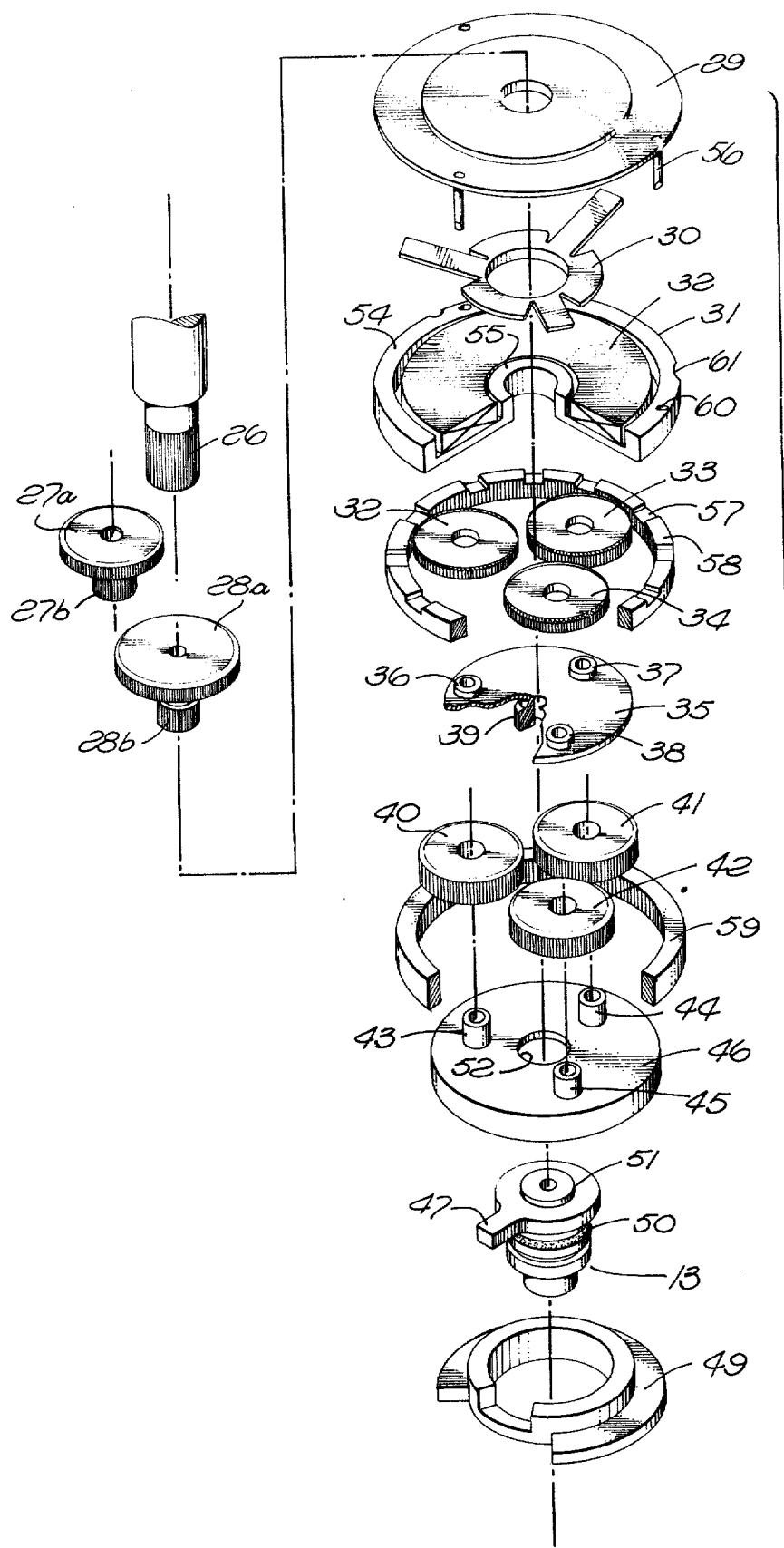
FIG. 3 is an exploded pictorial view of the planetary gearing and solenoid control parts of the actuator in FIG. 2.

Referring now to FIG. 2 and FIG. 3 together, the details of the structure and operation of the actuator according to the present invention will be described. Like parts from FIG. 2 are identified on FIG. 3 by the same reference numbers, of course. The exploded pictorial view of FIG. 3 considered at the same time as sectional view of FIG. 2 is intended to clarify the structure.

The gear reduction assembly 12 is included within a housing 25, a machined casting, for example. Housing 25 is not represented in FIG. 3, but is shown on FIG. 2. The output shaft of motor 11 forms a pinion gear 26. This pinion gear 26 drives an idler gear 27, shown on FIG. 3, but omitted from FIG. 2 for clarity. Pinion gear 26 engages 27a, and the smaller diameter part of the idler gear identified as 27b engages the larger diameter part 28a of a sun gear 28. The small diameter portion 28b of the said sun gear passes through a concentric opening in solenoid disc member 29, through the center of the spring 30 and the solenoid assembly 31 to engage the planetary gears 32, 33 and 34. The said planetary gears are carried on a carrier 35 and are rotationally mounted about bearing bushings 36, 37 and 38, respectively. A pinion gear 39, fixed to the bottom portion of the carrier 35, engages the second set of planetary gears comprising 40, 41 and 42. These second planetary gears are rotationally mounted on the bearing bushings 43, 44 and 45, respectively, on the planetary gear carrier 46.

This second planetary gear carrier 46 has an inverted panshape and an interior notch or other means, permitting it to rotationally engage a radial projection 47 on the output shaft subassembly 13. A retaining ring 48 around an internal circumferential groove within the down-facing open portion of the carrier 46, can provide the coupling between 46 and 47 by means of a pair of inwardly projecting portions on the ring 48, disposed on either side 47. The ring 49 serves mainly as an alignment part and as a rotational bearing piece, since it is free to rotate around the inward projection 25a of the housing casting. An O ring 50 affords a seal as 13 turns with respect to the housing 25. A shaft, or elongated pin 62, serves to align the sun gear 28, the first planetary gear carrier 35, the second planetary gear carrier 46 (indirectly in that the shaft or pin passes through the central bore in the output shaft part 13 to a limited depth as shown in FIG. 2, and the raised collar 51 on part 13 engages the central opening 52 in the second planetary gear carrier 46, effecting mutual alignment of these parts). The pin 51 also seats in the upper part of the housing casting 25, as illustrated in FIG. 2. The spring 30 contains an internal lip 53 provided to maintain its alignment and concentricity within the central opening in the solenoid housing 31. It will be noted that the solenoid housing 31 has two flat plane annular edges 54 and 55, which come into magnetic engagement with the solenoid disc 29 when the solenoid coil 32 is energized. The magnetic flux path through the magnetic flux transmissive material of 31 is thus toroidal in shape and includes the solenoid housing 54 and the disc 29, the latter also being flux transmissive.

Each of the two sets of planetary gears engages the internal gear teeth on a ring gear located in approximately the same plane as the respective planetary gear subassemblies. The planetary gears 32, 33 and 34 with their carrier 35, comprise a first planetary gear subassembly and the planetary gears 40, 41 and 42, with their carrier 46, comprise a second planetary gear subassembly. The first planetary gear subassembly ring gear is 58 and for the second planetary gear subassembly, the ring gear is identified as 59. The ring gear 58 is provided with circumferential notches, typically 57 and, in the absence of any restraint (as will be described hereinafter), the ring gear 58 is free to rotate.

The sun gear part 28b will cause planetary gears 32, 33 and 34 simply to rotate about their respective bearing bushes 36, 37 and 38, which in turn causes ring gear 58 to rotate. The frictional resistance offered to the rotation of 58 is substantially less than the resistance offered to the turning of the planetary gear carrier 35, and therefore, ring gear 58 turns and carrier 35 remains substantially fixed. The same principle will be seen to apply to the second planetary gear subassembly and its ring gear 59, namely, if the ring gear 59 is free to rotate, the pinion gear 39 will cause the planetary gears 40, 41 and 42 to rotate in place, rotating the ring gear 59, but not the carrier 46.

In a particular embodiment of the present invention, the ring gear 59 is fixed within the housing casting 25 by any known mechanical expedient, such as press-fitting, pinning, etc. Ring gear 58 is, however, mounted with minimal frictional resistance against rotation, but is restrained from rotation by the engagement of pins, typically 56, in the ring gear slots typically 57. The showing of FIG. 3 contemplates three circumferentially spaced pins, typically 56, and a larger number of circumferential slots 57 in ring gear 58.

When the solenoid coil 32 is energized, the solenoid disc 29, which is normally retained in an upward position (i.e., spaced away from solenoid housing 31) by spring 30, is drawn into contact with the annular solenoid housing faces 54 and 55, in the latter case, through the material of spring 30. It is to be noted that these slots 57 are spaced by a submultiple of the angular spacing of the said pins 56. The spring 30 is also of magnetically transmissive material and its radial arms extend less than the inside diameter of the annular face 54 to reduce the bypassing of magnetic flux by spring 30.

In operation, it will now be realized that, when the solenoid disc 29 is drawn down toward the solenoid housing 31, pin 56 passes through the hold 60 in 31, and into slot 57. One such pin 56 will accomplish this purpose functionally, but for the sake of balancing of lateral forces, at least three pins spaced 120° in the plane of the disc 29 are preferably employed.

It will be realized that the energizing of the solenoid 32 thus promptly arrests the rotational motion of the ring gear 58. The centers of planetary gears 32, 33 and 34 are now caused to rotate about the sun gear 28b, driving the carrier 35 and its pinion gear 39 into rotation at a geared-down speed. In view of the permanently fixed position of ring gear 59, the second planetary subassembly carrier 46 will be seen to rotate at a still lower rotational speed. The pinion gear 39 acts as a sun gear for this second planetary gear subassembly.

Removing the excitation from solenoid coil 32 permits the spring 30 to push the solenoid disc 29 upward, so that the pins typically 56 are withdrawn from the slots (typically 57), and ring gear 58 is again free to turn. This is the disengaged condition, and either manual override or the force of resilient means 22, is now able to rotate the output shaft 13, a reverse idling operation of the planetary gear subassembly occurs incidentally. Since ring gear 58 is free to turn, substantially no reverse torque is applied to the sun gear at 28b.

The device just described provides the equivalent of clutching in a positive-acting, relatively light, inexpensive device which is essentially integral with the reduction gearing.

it will be evident that the use of two sets of planetary gears is not at all a requirement for practicing the concepts of the present invention. The use of two sets of planetary gears is dictated only by the specific overall gear reduction ratio requirement. The inclusion of a substantial fraction of the overall gear reduction between the motor and the sun gear 28 in the form of the pinion 26 and the idler gear 27, tends to further reduce the back resistance of the entire assembly to the aforementioned manual or resilient means override as applied and described in accordance with FIG. 1.

Of course, still more planetary subassemblies can be ganged in similar fashion. The ring gear which is alternately restrained or freed to rotate could be the corresponding ring gear for any one of the planetary subassemblies. Obviously, certain accommodation of the solenoid location is required if the controlled planetary subassembly is not the "top" one. Still further, a single, axially thicker ring gear can obviously replace the two ring gears 58 and 59.

It will also be realized that only a single planetary gear in each of the planetary gear subassemblies is actually necessary in order to produce the results desired. The use of three planetary gears however, affords improved lateral force balancing.

The solenoid housing 31 is, of course, not permitted to turn, and accordingly, no slip rings or other such measures are necessary. The solenoid coil housing 31 is retained in place by an expedient such as a cap screw into the body of the housing casting 25, the head of the said cap screw engaging the notch 61, as shown in FIG. 2.

Application of electric power to the solenoid coil 32, comtemporaneously with energization of the motor 11 in one direction or the other, would normally be contemplated, and the circuits and switching necessary to effect this would be obvious to persons skilled in these arts. Such additional devices as limit switches, which are normally incorporated in connection with actuators of the present type, and burn-out protectors for the motor 11, are omitted from the showing and description for simplicity, since they are at least generically well known of themselves and have no direct relation to the novel combination of the invention, per se.

Many other modifications and variations falling within the spirit of the invention will suggest themselves to those skilled in these arts. Also, many additional applications will suggest themselves for the employment of the discrete, positive clutching function afforded by the invention in a relatively economical and lightweight device. The engagement, or disengagement by control of the energization of solenoid coil 32 can, of course, be programmed to fit any particular requirement.

The drawings and this description are to be regarded as typical and illustrative only and not to be considered as limiting the scope of the invention.

What is claimed is:

1. A rotational actuator having an output shaft for effecting angular motion through a predetermined angle in at least one angular sense, comprising:
   a drive motor having a shaft which rotates in response to a solenoid operated applied electrical power signal;
   a first reduction gear assembly having input and output shafts, and including at least one rotatably mounted ring gear, at least one planetary gear subassemblies each including a rotatably mounted disc and at least one planetary gear rotatably mounted thereon, said planetary gears each engaging the teeth of said ring gear;

means including a sun gear engaging each planetary gear on said disc to couple said drive motor to said gear assembly, and means mechanically coupling said disc to said output shaft;

and engagement means comprising an electromechanical device for providing mechanical locking of said ring gear to prevent its rotation, said engagement means operating in response to an electrical control signal applied to the magnetizing coil of said solenoid.

2. Apparatus according to claim 1, including at least first and second planetary subassemblies within said first reduction gear assembly mounted substantially coaxially with their discs in substantial parallel planes, said first planetary subassembly being the one coupled to said drive motor and having a pinion gear affixed to said disc and engaged with the planetary gears of said second planetary subassembly, the disc of said second planetary subassembly including means for coupling to said output shaft of said reduction gear assembly.

3. Apparatus according to claim 2 in which first and second rotatably mounted ring gears are provided, said ring gears having internal circumference gear teeth, said internal teeth of said first ring gear engaging said planetary gears of said first planetary subassembly and said planetary gears of said second planetary subassembly engaging said internal teeth of said second ring gear, said second ring gear being permanently mechanically restrained against rotation.

4. Apparatus according to claim 3 in which said electro-mechanical device includes;

a coaxial solenoid coil and cylindrical housing of magnetic flux transmissive material surrounding said coil but having an open end facing opposite from said first planetary subassembly;

a solenoid disc member of magnetic flux transmissive material constrained against rotation but free to translate a predetermined distance between a first position in contact with said cylindrical enclosure open end and a second position spaced said predetermined distance from said enclosure open end, between energized and de-energized conditions of said solenoid coil, respectively, said disc being mechanically arranged to effect said mechanical locking of said first ring gear when said solenoid disc is in said first position.

5. Apparatus according to claim 4 including resilient means operative to mechanically bias said solenoid disc member in said second position, said resilient means exerting sufficient force to return said solenoid disc to said second position when said coil is de-energized, said force being sufficiently low to permit the magnetic flux generated by said coil to effect transfer of said disc to said first position during said coil energization.

6. Apparatus according to claim 5 in which said solenoid disc includes at least one integral pin extending toward said first ring gear and said first ring gear end surface facing said solenoid disc includes at least one groove, whereby said pin engages said first ring gear at a point during rotation thereof when said solenoid disc is being subjected to magnetic force tending to cause it to assume said first position, thereby to effect said mechanical locking of said first ring gear.

7. Apparatus according to claim 6 in which there are a plurality of said pins spaced about the perimeter of said solenoid and said first ring gear contains at least as many correspondingly spaced grooves such that said pins fit therein when said solenoid disc is in said first position.

8. Apparatus according to claim 1 including lever means connected to said reduction gear assembly output shaft, said lever being arranged to rotate through said predetermined angle to control a related mechanical function;

and resilient lever biasing means connected to cause said lever to travel to one of the two extreme positions defining said predetermined angle upon release of said engagement means, the one of said extreme positions to which said lever travels corresponding to the side of dead-center occupied by said lever at the time of said release, said dead-center being defined as a predetermined angular position within said predetermined angle.

9. Apparatus according to claim 8 in which said dead-center is defined as substantially midway between said extreme positions.

10. Apparatus according to claim 8 including second gear reduction means between said drive motor and said sun gear to reduce the gear reduction required of said first reduction gear assembly and consequently to reduce the resistance offered to said resilient lever biasing means when said engagement means is released, thereby to also effect easier manual override applied to said lever means when said engagement means is released.

* * * * *